US012211288B2

(12) United States Patent
Wong

(10) Patent No.: US 12,211,288 B2
(45) Date of Patent: Jan. 28, 2025

(54) MANAGING TRAFFIC LIGHT DETECTIONS

(71) Applicant: Motional AD LLC, Boston, MA (US)

(72) Inventor: Chong Meng Wong, Singapore (SG)

(73) Assignee: Motional AD LLC, Boston, MA (US)

(*) Notice: Subject to any disclaimer, the term of this patent is extended or adjusted under 35 U.S.C. 154(b) by 250 days.

(21) Appl. No.: 17/876,340

(22) Filed: Jul. 28, 2022

(65) Prior Publication Data
US 2024/0038065 A1 Feb. 1, 2024

(51) Int. Cl.
*G06V 20/58* (2022.01)
*G06V 10/82* (2022.01)

(52) U.S. Cl.
CPC ............ *G06V 20/584* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 8,761,991 | B1* | 6/2014 | Ferguson | G08G 1/096758 701/28 |
| 9,327,734 | B2* | 5/2016 | Lombrozo | G06V 20/584 |
| 2013/0285840 | A1* | 10/2013 | Allen | G08G 1/07 340/923 |
| 2018/0112997 | A1* | 4/2018 | Fasola | G01C 21/3407 |
| 2020/0238996 | A1* | 7/2020 | Pendleton | B60W 40/04 |
| 2021/0061269 | A1* | 3/2021 | Petroff | B60W 40/04 |
| 2021/0261152 | A1 | 8/2021 | Meijburg et al. | |
| 2022/0076036 | A1 | 3/2022 | Taieb et al. | |
| 2023/0091987 | A1* | 3/2023 | Pendleton | B60W 50/0097 701/26 |
| 2023/0169780 | A1* | 6/2023 | Sharma | G06N 3/09 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
Invitation to Pay Additional Fees in International Appln. No. PCT/US2023/028963, mailed on Oct. 20, 2023, 14 pages.
Xin et al., "A Literature Review of the Research on Take-Over Situation in Autonomous Driving," Design, User Experience, and Usability. Application Domains. HCII 2019. Lecture Notes in Computer Science, Jul. 2019, 11585:160-169.
International Search Report and Written Opinion in International Appln. No. PCT/US2023/028963, mailed on Dec. 8, 2023, 22 pages.

* cited by examiner

*Primary Examiner* — Daniel L Greene
(74) *Attorney, Agent, or Firm* — Fish & Richardson P.C.

(57) ABSTRACT

Provided are methods for managing traffic light detections, which can include: deriving a first state of a traffic light at an intersection a vehicle is approaching, according to first detection data acquired by a first traffic light detection (TLD) system; deriving a second state of the traffic light at the intersection, according to second detection data acquired by a second TLD system that is independent from the first TLD system; determining traffic light information at the intersection based on at least one of (i) the first state or (ii) a result of checking whether the first state is same as the second state; and causing the vehicle to operate in accordance with the determined traffic light information at the intersection. Systems and computer program products are also provided.

17 Claims, 11 Drawing Sheets

MANAGING TRAFFIC LIGHT DETECTIONS

BACKGROUND

Autonomous vehicles use sensors to generate sensor data associated with their environment and use that sensor data to perceive and operate within that environment. But it can be difficult to analyze certain objects, such as traffic lights.

DETAILED DESCRIPTION

Figure 1:
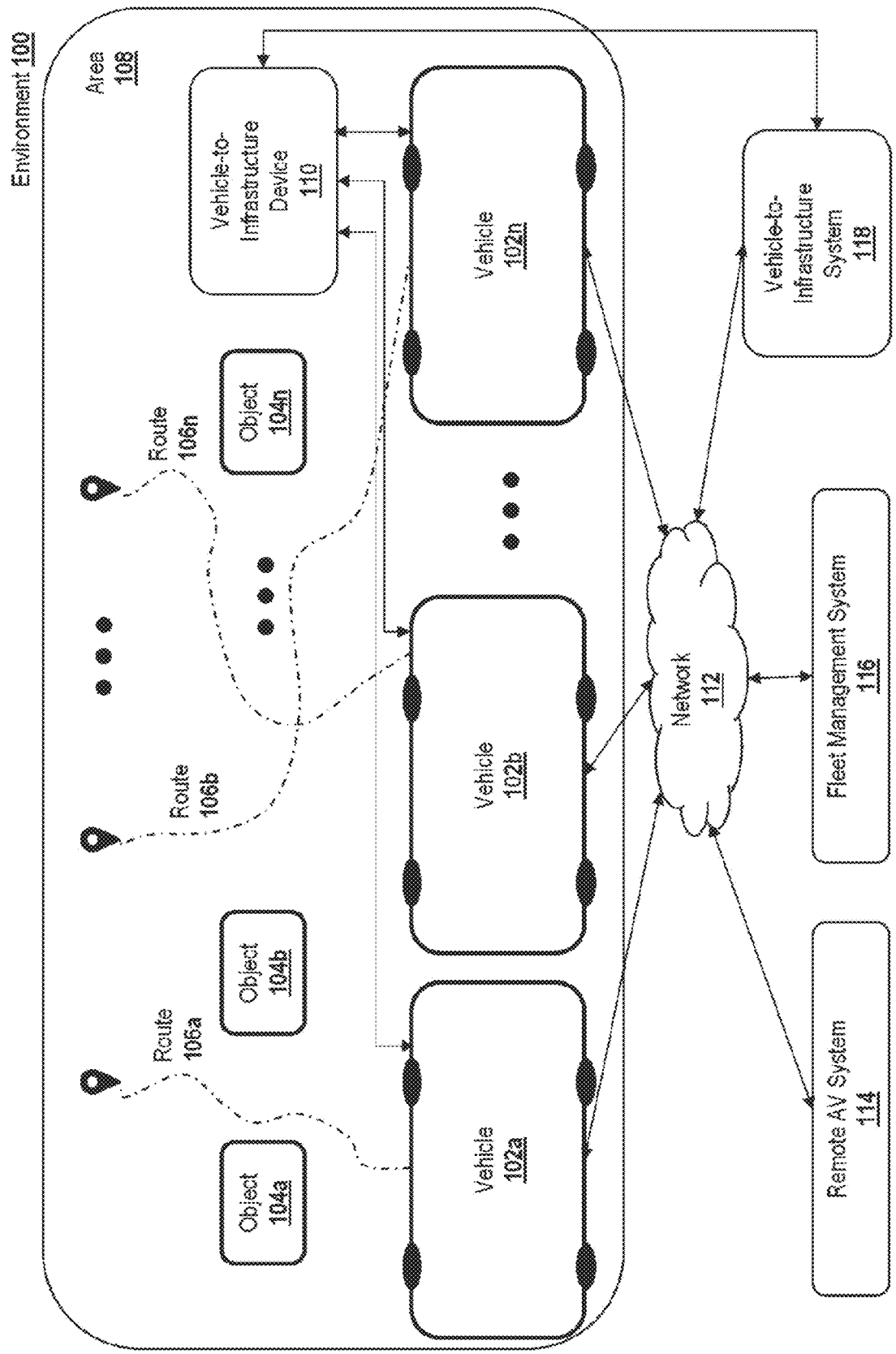
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof. As used herein, "satisfy" refers to meeting a predetermined condition or requirement, for example, no greater than a predetermined threshold, or no less than a value.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement techniques for detecting traffic lights. A vehicle (e.g., an autonomous vehicle) is configured to manage traffic light detections at intersections for reliable decision making. Specifically, when the vehicle is approaching an intersection, the vehicle's front view traffic light detection (TLD) system (e.g., using front cameras) classifies a current state (e.g., red, yellow, or green) of a traffic light at the intersection. To prevent the vehicle from operating in an unintended fashion, e.g., running a red light, when the front view TLD system malfunctions or is unavailable, the vehicle cross-checks the front view TLD system result using a separate, independent side view TLD system including sensors (e.g., left/right side cameras, left/right LiDAR sensors, and/or left/right Radar sensors) to monitor (e.g., track) cross traffic events and/or behaviors at the intersection. Collected side view sensor data can be used to detect (e.g., through a sensor tracking algorithm or a machine learning model) different types of cross traffic information at various locations at the intersection (e.g., at road segments perpendicular to a driving direction of the vehicle). Based on the detected cross traffic information, the vehicle derives a state of the traffic light at the intersection ahead of the vehicle, e.g., by determining whether a field of view of the cross traffic is occluded, whether the cross traffic is stopping or moving, whether a distance between the cross traffic and the intersection is decreasing or increasing, and/or whether the cross traffic is decelerating or accelerating.

When the front view TLD system detects a red or yellow light, the vehicle uses the detected traffic light for decision making (e.g., deceleration or full stop), and the vehicle can optionally bypass cross-checking with the side sensors. When the front view TLD system detects a green light, the vehicle uses the side view TLD result to cross-check the front view TLD result by detecting cross traffic events/behaviors at the intersection and derives a corresponding traffic light state. The vehicle compares the green light state detected by the front view TLD system with the derived traffic light state by the side sensors. If the two states are same, the vehicle determines a current state of the traffic light to be green and proceeds through the intersection. If the two states are different, the vehicle determines that a current state of the traffic light is red and proceeds to stop or decelerate, which can prevent a possible scenario of operating in an unintended manner, e.g., running a red light.

By virtue of the implementation of systems, methods, and computer program products described herein, techniques for managing traffic light detection are enabled. First, the techniques enhance a vehicle's front view traffic light detection (TLD) system by adding cross traffic information at an intersection, which provides comprehensive, consistent, cross-checked, and accurate traffic light information at the intersection. Second, the techniques use side view sensors, independent from the front view TLD system, to derive a separate, independent TLD result to cross-check the front view TLD result, which ensures the reliability of cross-checking. Third, the techniques use different types of side view sensors (e.g., cameras, LiDAR sensors, and/or Radar sensors) for detecting different types of cross traffic information at the intersection, which provides multiple and/or cascaded checks on the traffic light state at the intersection to ensure correctness of the side sensors based TLD result for reliable cross-checking. Fourth, the techniques actively prevent the vehicle from operating in an unintended manner, e.g., running a red light at the intersection when the front view TLD system malfunctions or is unavailable, which ensures reliable decision making and improves driving safety. For example, the techniques prevent side traffic conflicts and near traffic conflicts, due to no "crumple zones" on a side of the vehicle when operating in an unintended manner, e.g., running a red light. A near traffic conflict is an event in which no property was damaged and no personal injury was sustained, but where, given the absence of an evasive maneuver, damage or injury could have occurred. A near traffic conflict is an occurrence defined by a possibility of a traffic conflict but for a maneuver initiated by the vehicle. Traffic conflicts are contact between the vehicle and an actor in an environment.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
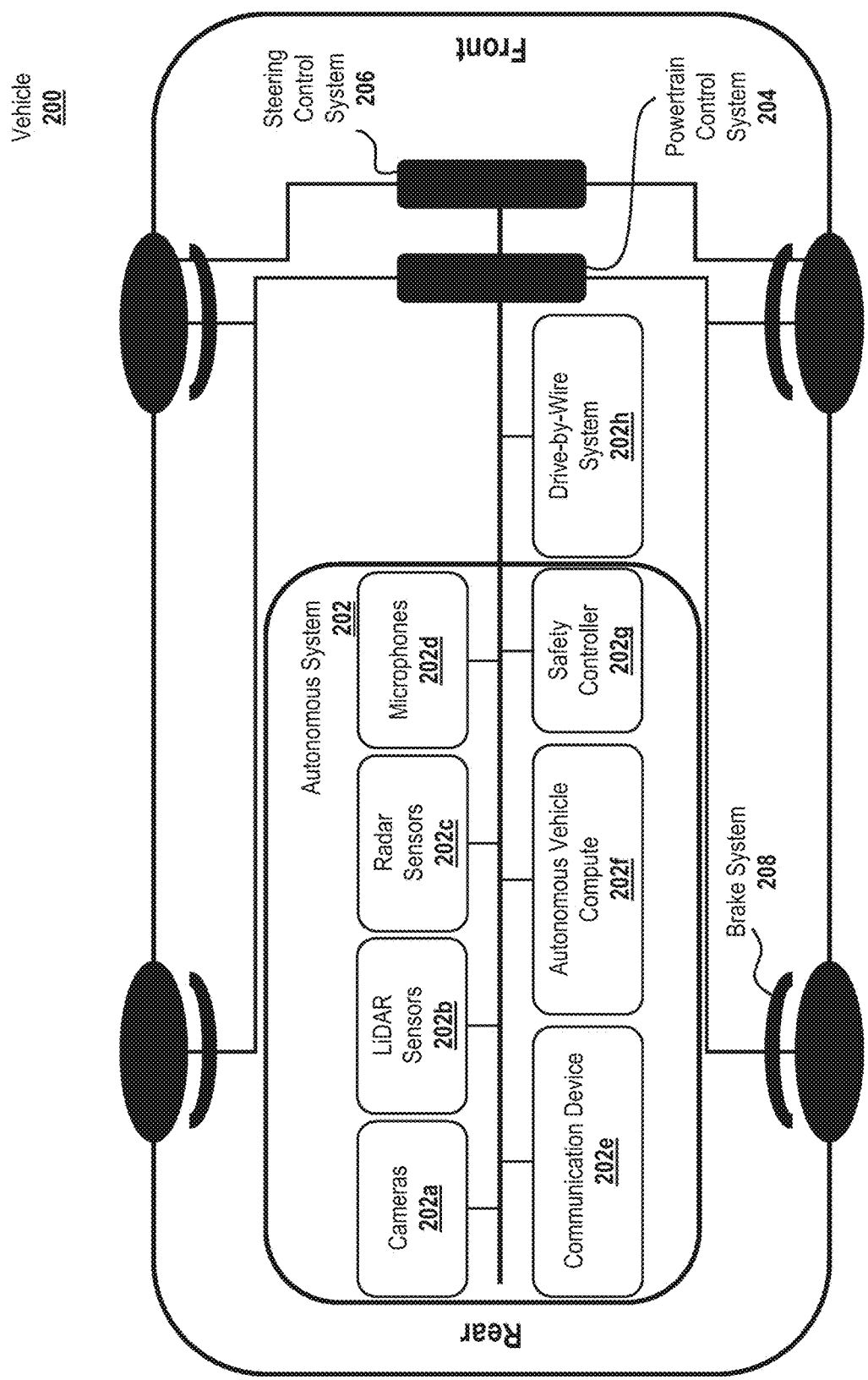
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
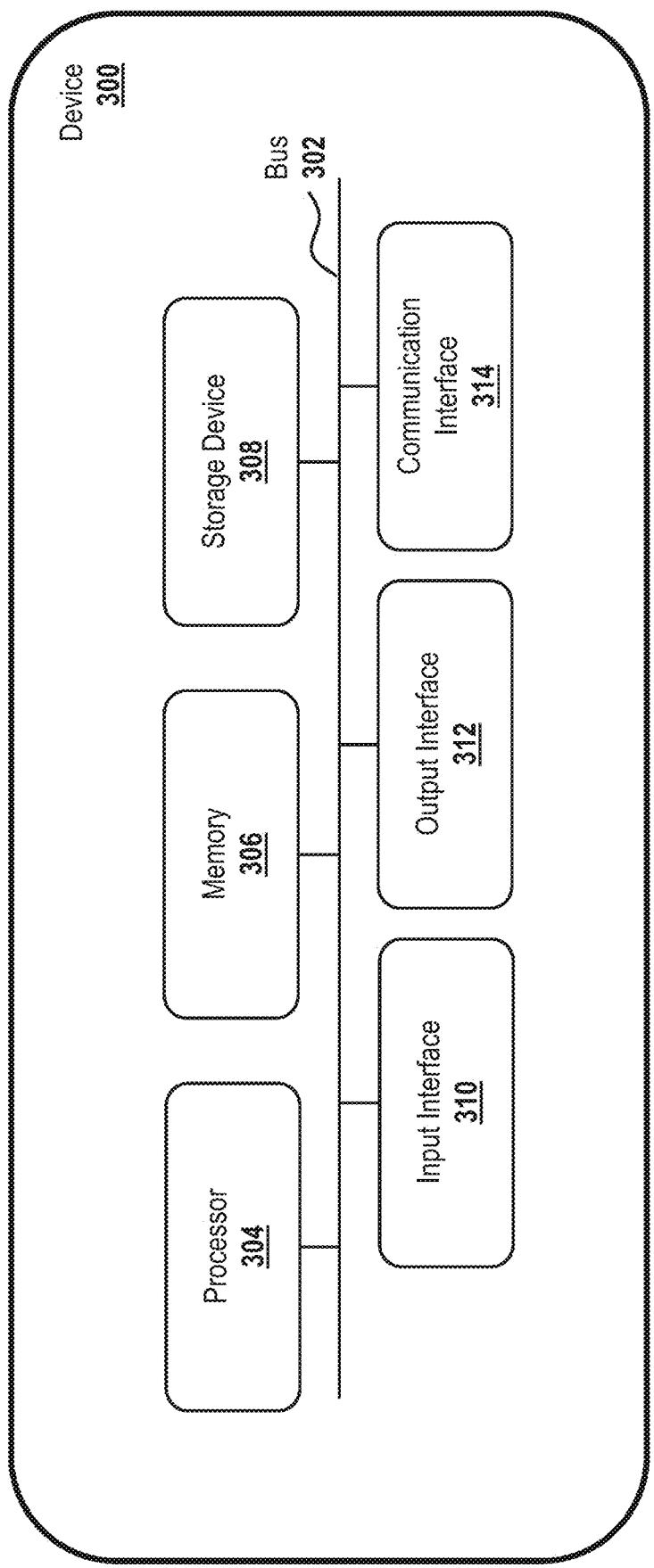
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object.

In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of vehicles 102 (e.g., at least one device of a system of vehicles 102, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi© interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
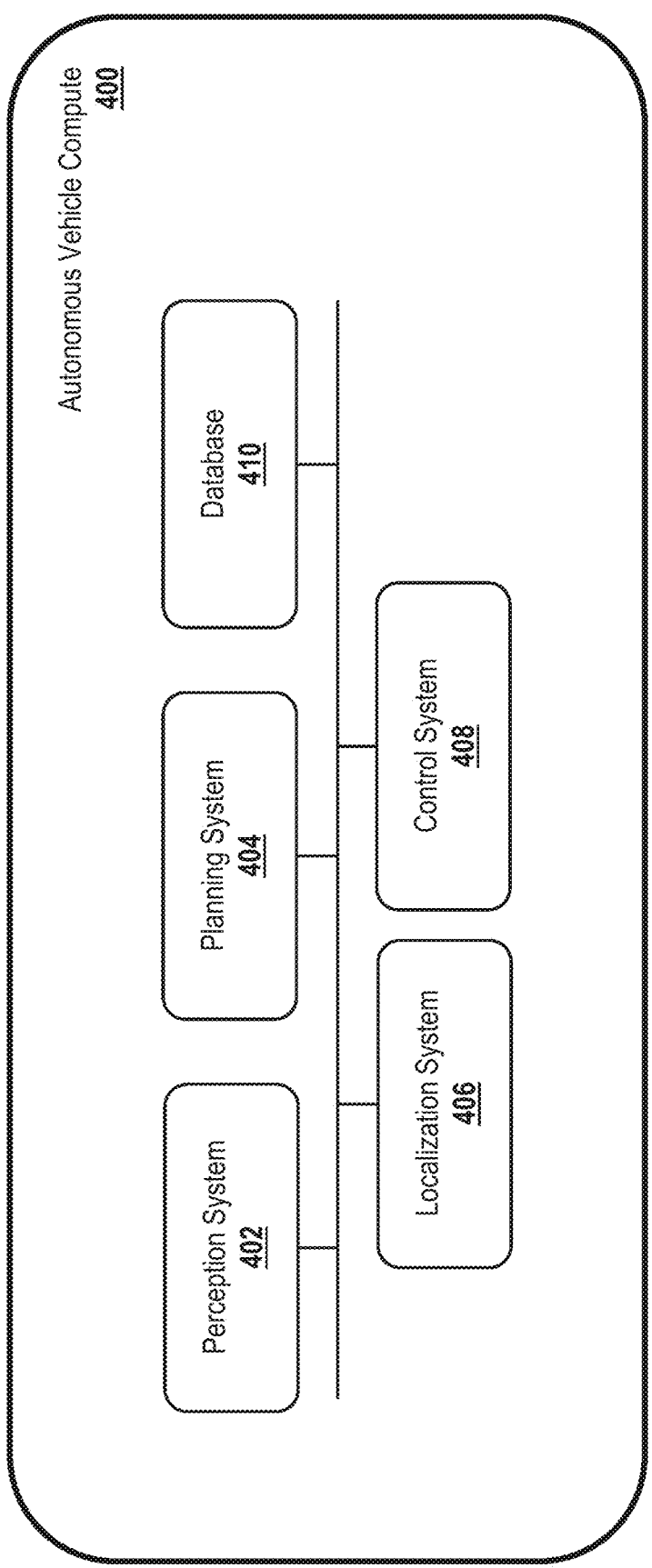
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
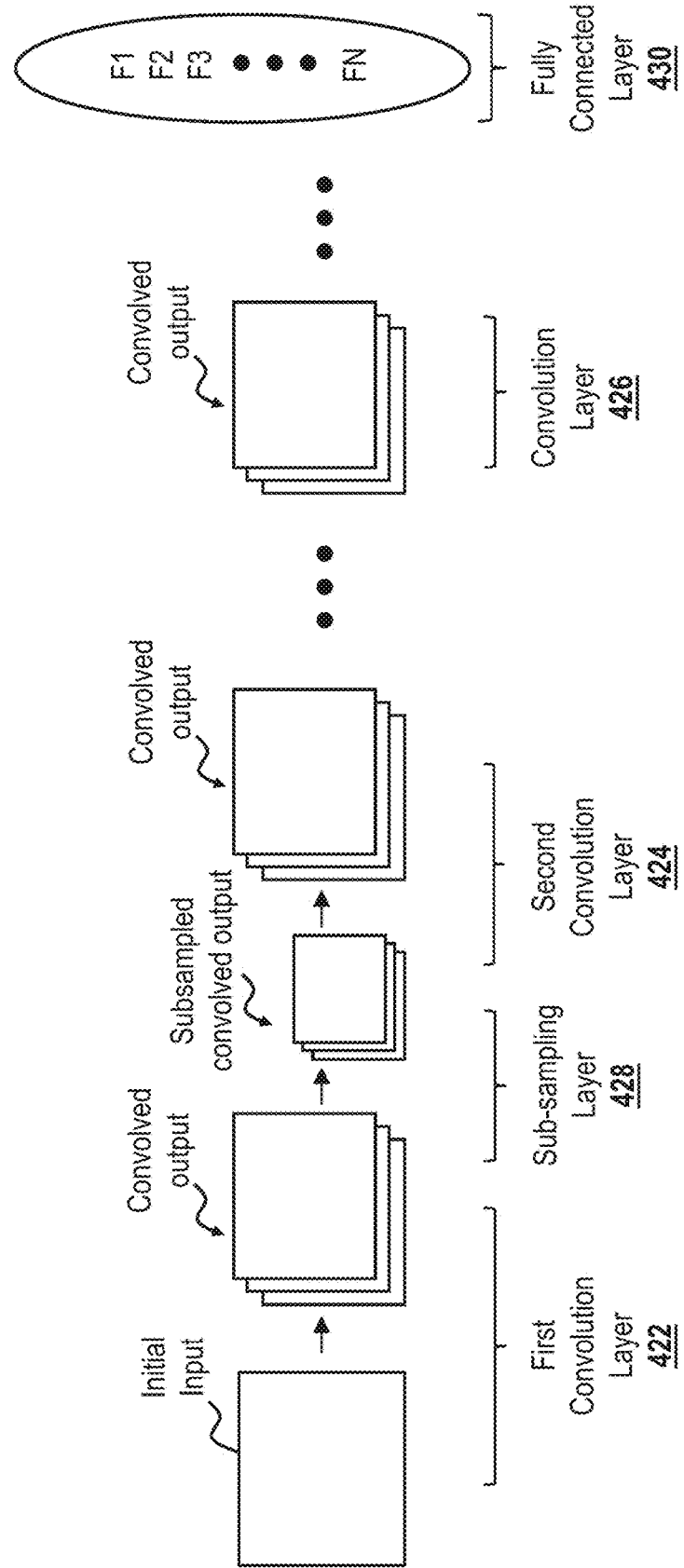
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
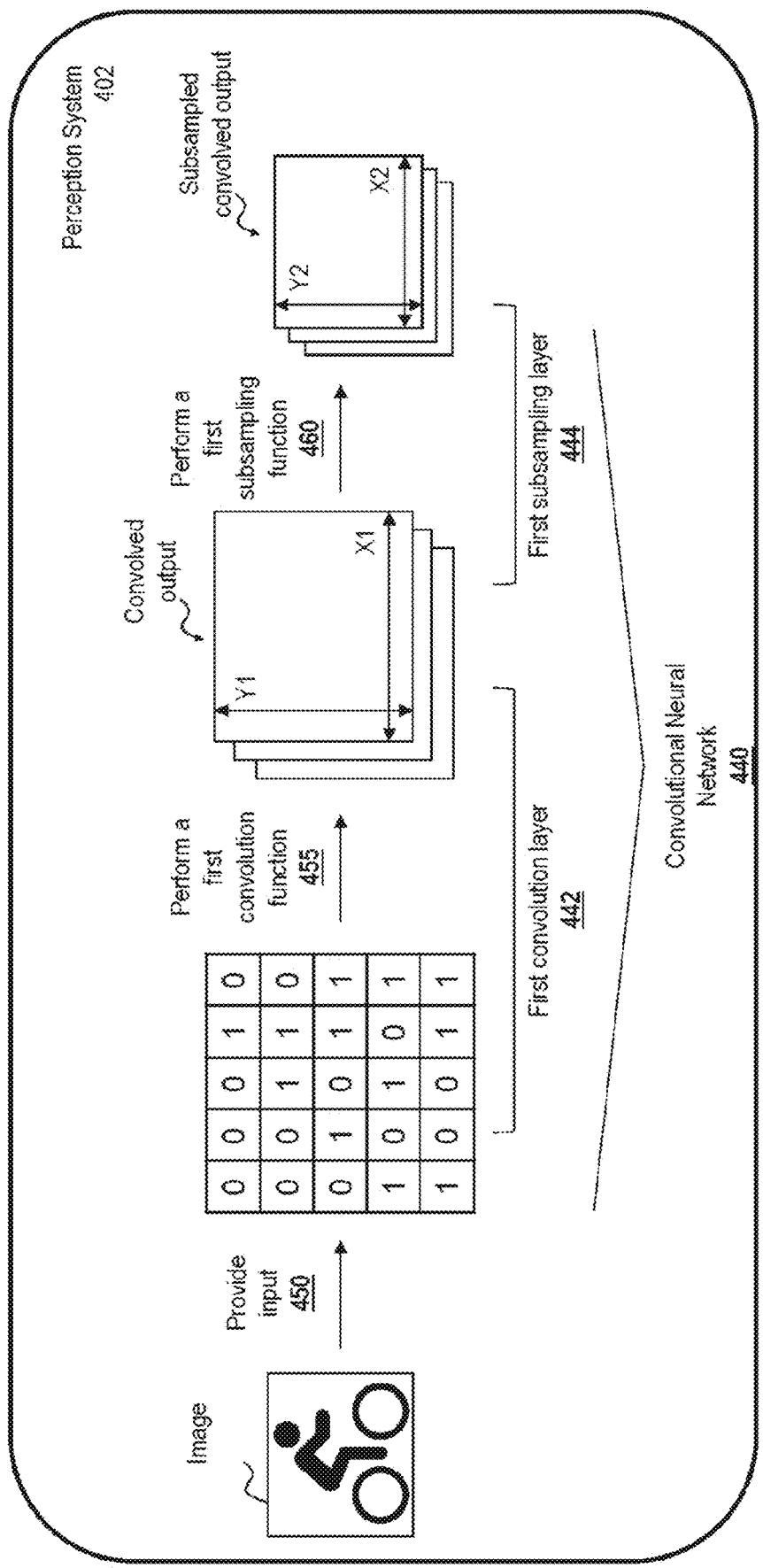
FIGS. 4C and 4D are a diagram illustrating example operation of a CNN.
Figure 4D:
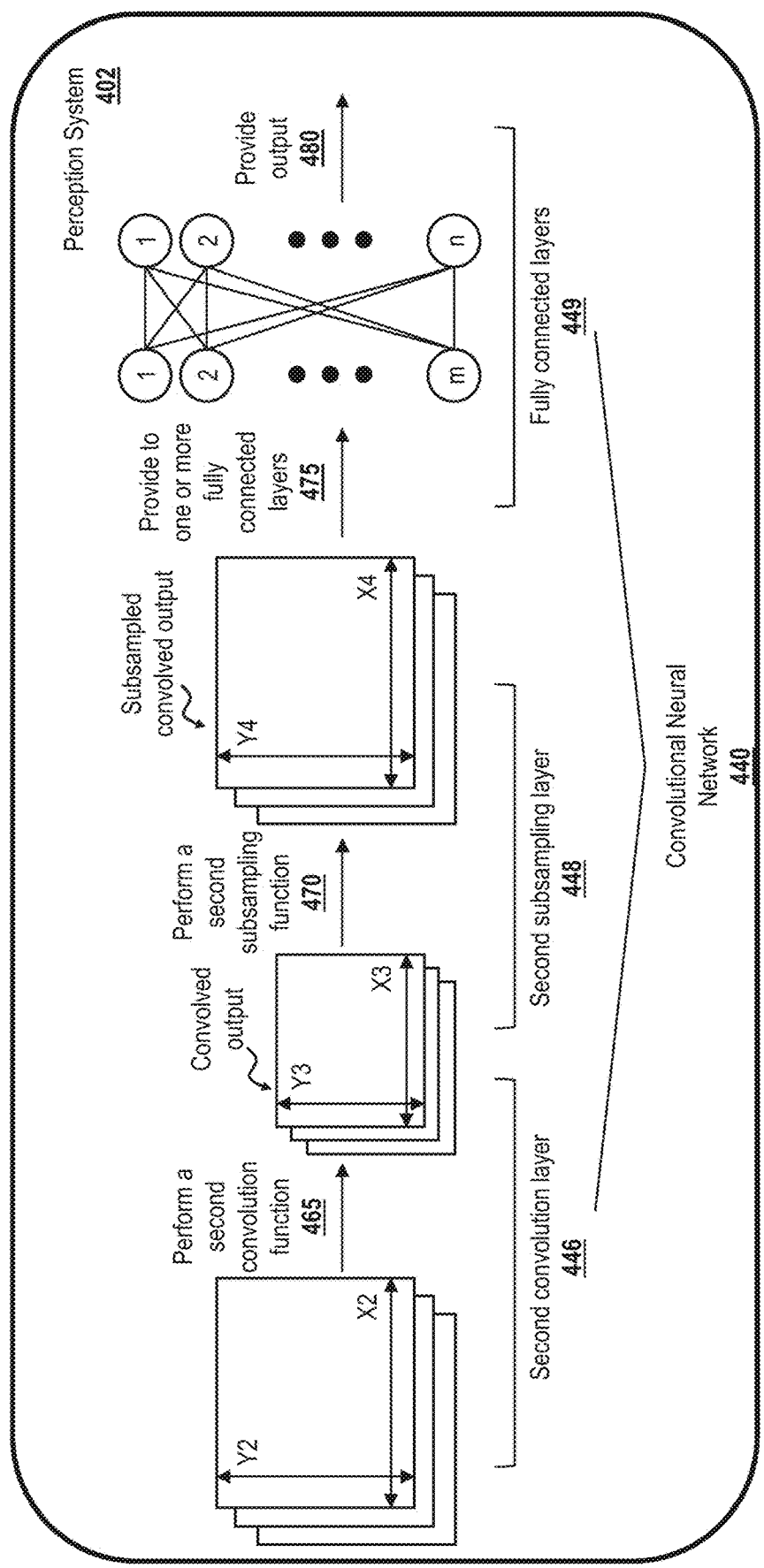

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output 480. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
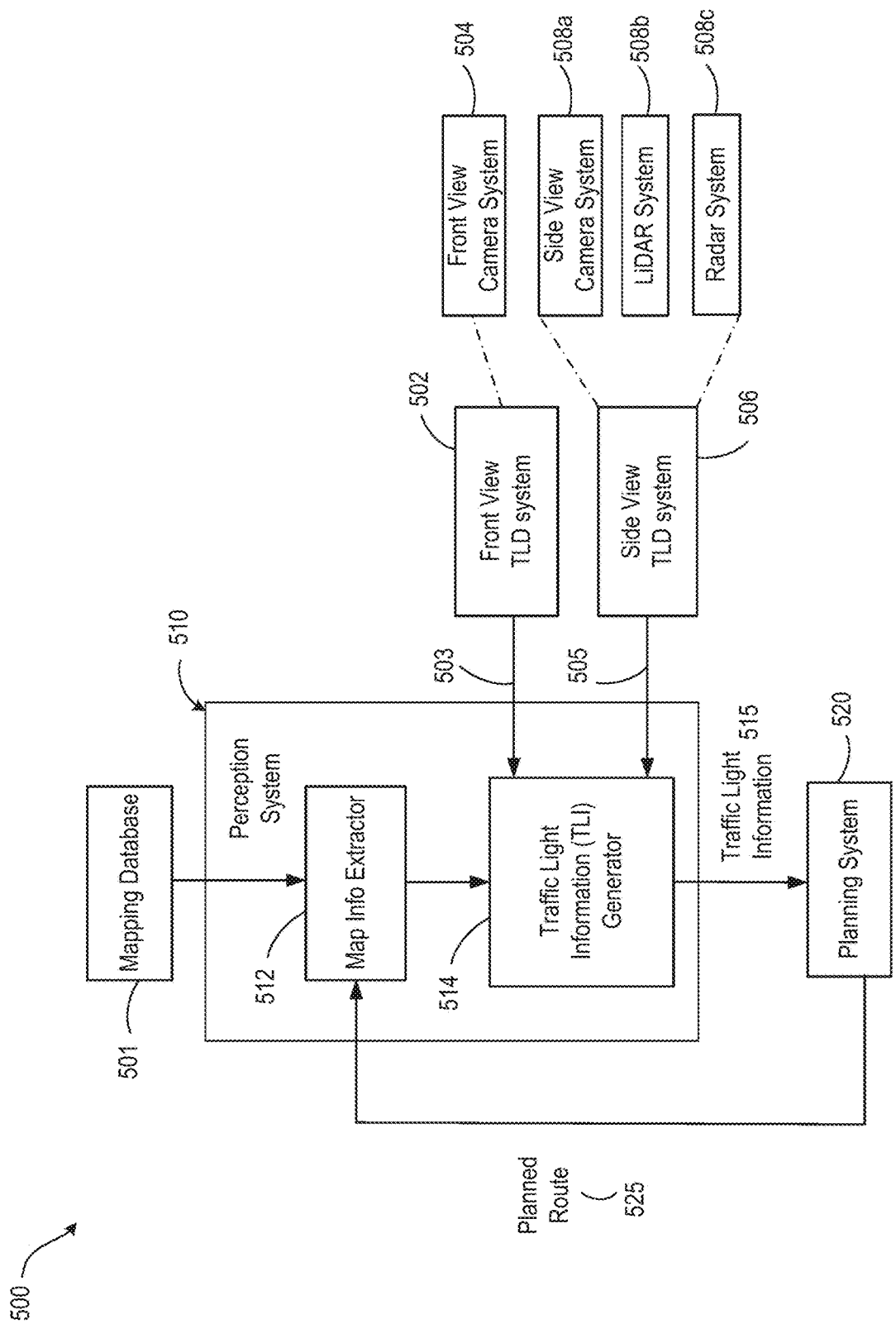
FIG. 5 shows a block diagram of an architecture for managing traffic light detection.

FIG. 5 shows a block diagram of an architecture 500 for managing traffic light detections, in accordance with one or more embodiments. In an embodiment, the architecture 500 is implemented in an autonomous system of a vehicle. In some examples, the vehicle is the vehicle 200 shown in FIG. 2, and the architecture 500 is implemented (e.g., completely, partially, etc.) by the autonomous system 202 of the vehicle 200. The architecture 500 is configured to manage traffic light detections at intersections for reliable decision making by cross-checking traffic light detections derived from different traffic light detection (TLD) systems.

The architecture 500 includes a perception system 510 (which is the same as, or similar to, perception system 402 shown in FIG. 4A, in some embodiments) and a planning system 520 (which is the same as, or similar to, the planning system 408 shown in FIG. 4A, in some embodiments). The perception system 510 selectively obtains area information of at least one intersection from a mapping database 501, e.g., based on a current location of the vehicle and/or a route of the vehicle. The mapping database 501 stores a data structure associating each intersection with traffic lights at the intersection and corresponding states. Based on the area information and traffic light detection data, the perception system 510 determines traffic light information 515, e.g., a state of the intersection or a state of a traffic light for an incoming road segment at the intersection. The perception system 510 provides the traffic light information 515 to the planning system 520 to determine an action to be taken by the vehicle as it arrives at the intersection. The action to be taken can be, for example, to stop, to slow down, or to continue at current speed or speed up, among other suitable actions. The planning system 520 determines the action based on the traffic light information 515 and other data, e.g., data from the localization system 406 and the database 410 of FIG. 4A. The vehicle operates in accordance with the determined action by a control system, which is the same as, or similar to, control system 408 as shown in FIG. 4A.

In some embodiments, the control system receives data associated with the determined action from planning system 520, and the control system controls operation of the vehicle. In some examples, the control system controls operation of the vehicle by generating control signals based on the data associated with the determined action and transmitting the control signals to cause a powertrain control system (which is the same as, or similar to, DBW system 202h or powertrain control system 204, in some embodiments), a steering control system (which is the same as, or similar to, steering control system 206, in some embodiments), and/or a brake system (which is the same as, or similar to, brake system 208, in some embodiments) to operate. For example, when operating in an unintended manner, e.g., running a red light, is detected and the determined action is to slow down or stop, the control system generates and transmits a control signal to the brake system to decelerate or prepare to stop; when a green light is detected and the determined action is to continue at a current speed or speed up, the control system generates and transmits a control signal to the powertrain control system to maintain the current speed or speed up. In such a way, the reliable cross-checking traffic light detection enables the vehicle to drive safely, even when a front view TLD system malfunctions.

In one embodiment, the architecture 500 includes the mapping database 501, e.g., implemented in the database 410 shown in FIG. 4A. In another embodiment, the mapping database 501 is external to the architecture 500 and stored in a server, e.g., a server of the remote AV system 114 shown in FIG. 1. The mapping database 501 includes road network information, e.g., high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of areas of interest such as intersections, crosswalks, traffic signs or other travel signals of various types. In an embodiment, the high-precision maps are constructed by adding data, through automatic or manual annotation, to low-precision maps. For illustration purposes only, an intersection is described herein as an example of an area of interest.

The mapping database 501 includes area information of intersections in maps. In one embodiment, area information of an intersection includes an intersection identifier (ID), a series of states for the intersection representing behaviors of traffic lights at the intersection, information about road segments at the intersection, and information about traffic lights at the intersection.

Figure 6:
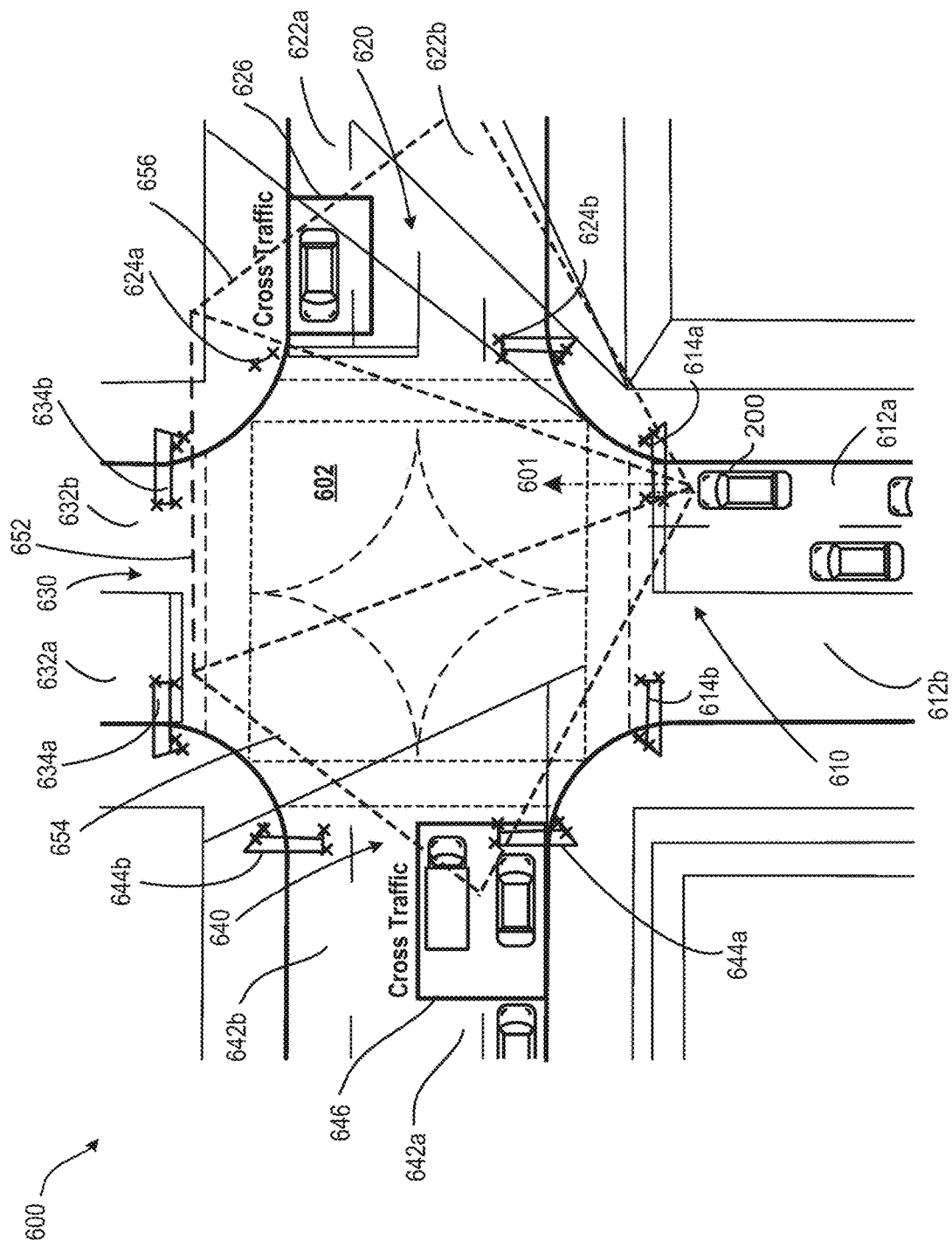
FIG. 6 shows an example of traffic light detection at an intersection.

FIG. 6 shows a schematic diagram of an example traffic light detection 600 at an intersection 602. In some embodiments, the intersection 602 is an intersection that is traversed by a vehicle (which is the same as, or similar to, the vehicle 200, in some embodiments), and corresponds to an area of interest for the vehicle. In some embodiments, e.g., as shown in FIG. 6, the intersection 602 is associated with four road segments 610, 620, 630, 640 around a center of the intersection 602. Each road segment represents an area around the intersection and is associated with two paths, e.g., with opposite or angled traffic directions. Each path includes one or more lanes.

In some embodiments, as shown in FIG. 6, the road segment 610 is associated with a first path 612a with a first path direction and a second path 612b with a second path direction that is opposite to the first path direction. The road segment 620 is associated with a third path 622a with a third path direction and a fourth path 622b with a fourth path direction that is opposite to the third path direction. The road segment 630 is associated with a fifth path 632a with a fifth path direction and a sixth path 632b with a sixth path direction that is opposite to the fifth path direction. The road segment 640 is associated with a seventh path 642a with a seventh path direction and an eighth path 642b with an eighth path direction that is opposite to the seventh path direction. In some cases, the sixth path direction is same as the first path direction and the sixth path 632b is an extension of the first path 612a; the eighth path direction is same as the third path direction and the eighth path 642b is an extension of the third path 622a; the second path direction is same as the fifth path direction and the second path 612b is an extension of the fifth path 632a; the fourth path direction is same as the seventh path direction and the fourth path 622b is an extension of the seventh path 642a. The pairs of the paths, 632b and 612a, 642b and 622a, 612b and 632a, 622b and 642a, are separated by the intersection 602.

At (or around) each road segment, there are one or more traffic lights positioned there and configured to control vehicular movement of traffic for the road segment and/or one or more other road segments. As illustrated in FIG. 6, at (or around) the road segment 610, there are two traffic lights 614a, 614b; at (or around) the road segment 620, there are two traffic lights 624a, 624b; at (or around) the road segment 630, there are two traffic lights 634a, 634b; at (or around) the road segment 640, there are two traffic lights 644a, 644b. Each traffic light includes three light bulbs, e.g., red, yellow, and green. In one embodiment, a traffic light includes an arrow, e.g., a left arrow, a right arrow, an up arrow, or a down arrow.

Each traffic light is positioned toward a road segment for governing traffic (e.g., including vehicles and/or pedestrians) movement associated with the road segment, e.g., from the road segment. For example, the traffic light 614a is positioned at the road segment 610 and toward vehicles travelling on the path 612a associated with the road segment 610, while the traffic light 634b is positioned at the road segment 630 and also towards vehicles travelling on the path 612a for governing traffic movement associated with the road segment 630. Thus, a road segment can be associated with traffic lights positioned at the road segment and also traffic lights positioned at one or more other road segments at the same intersection 602, and the traffic lights are positioned towards the road segment for governing traffic movement associated with the road segment.

The vehicle 200 is travelling along a route, e.g., route 601, approaching the intersection 602 from the road segment 610. To make a driving decision, in one embodiment, the vehicle 200 monitors behaviors of traffic lights governing traffic movement for the road segment 610 at the intersection 602, that is, the traffic lights 614a and/or 634b, and/or behaviors of cross traffic lights (e.g., the traffic lights 624a, 644b for the cross road segment 620, and/or the traffic lights 624b, 642b for the cross road segment 640).

Referring back to FIG. 5, the perception system 510 includes a map information extractor 512. The map information extractor 512 extracts area information of one or more areas of interest for the vehicle. In one example, based on a current location and/or a current route of the vehicle, the map information extractor 512 extracts area information of one or more intersections around the current location of the vehicle and/or the current route of the vehicle. Area information of an intersection includes intersection identifier (ID), a series of states for the intersection representing traffic light behaviors at the intersection, information of road segments in the intersection, and information of traffic lights for the road segments. The information of traffic light for the road segments includes a series of states for each traffic light and a predetermined time duration for each state. States of the traffic lights for different road segments at a same intersection are coordinated with each other. For example, if a traffic light (e.g., 634b) for a road segment (e.g., 610) is in a green state, a first cross traffic light (e.g., 644b) for a first cross road segment (e.g., 620) and a second cross traffic light (e.g., 624b) for a second cross road segment (e.g., 640) are in a red state. If the traffic light for the road segment is in a red state, the first cross traffic light for the first cross road segment and the second cross traffic light for the second cross road segment are in a green state. The series of states of the traffic light change in a loop, where a first state starts when a last state ends.

Figure 7:
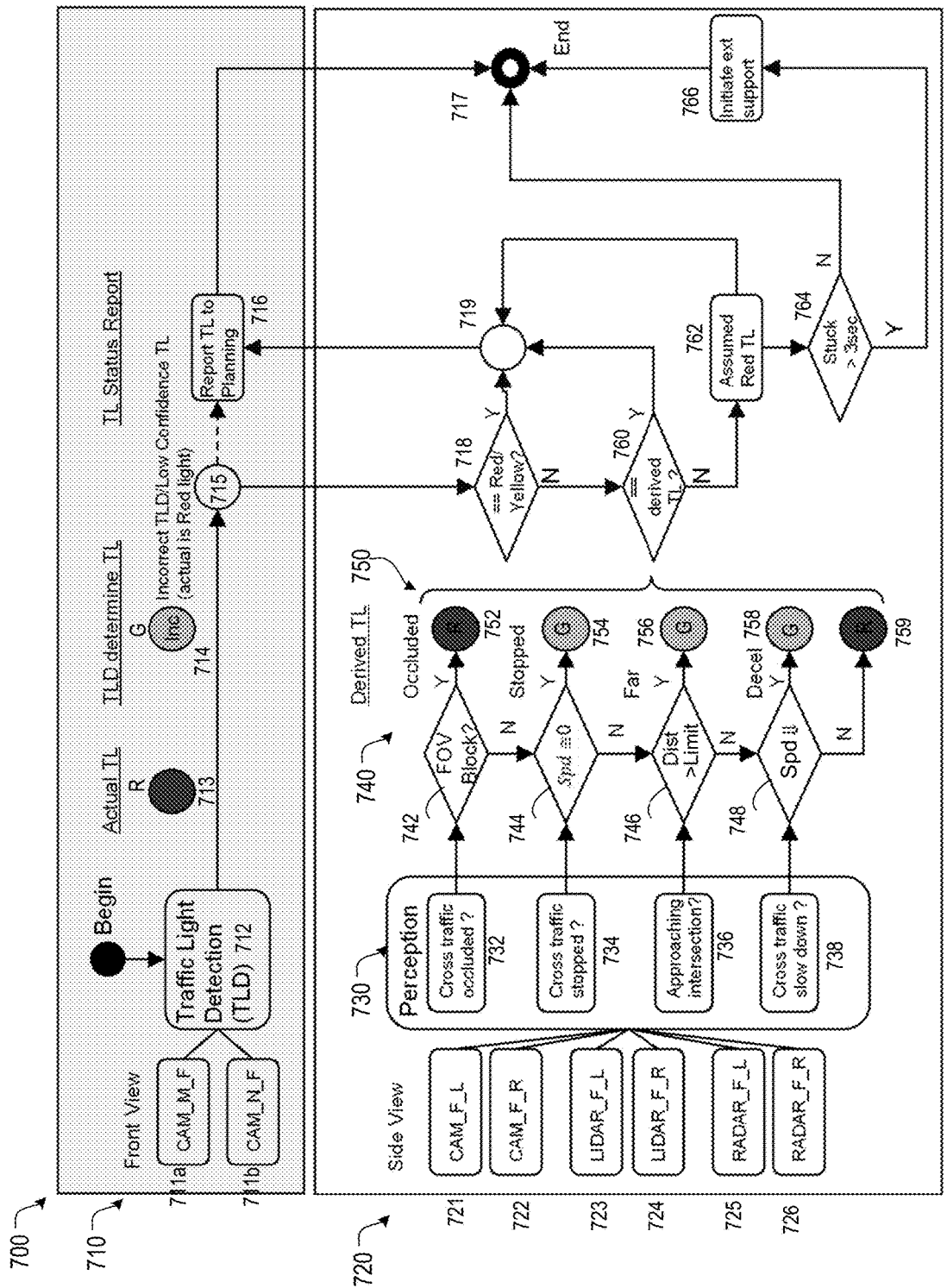
FIG. 7 is a flowchart of a process for managing traffic light detection.

In one embodiment, as shown in FIG. 5, the architecture 500 includes a front view traffic light detection (TLD) system 502 for sensing or measuring properties of the vehicle's environment in front of the vehicle. In one example, the front view TLD system 502 uses a front view camera system 504 to obtain information about traffic lights, street signs, and other physical objects that provide visual navigation information. The front view camera system 504 has a field of view (FOV), e.g., a FOV 652 of FIG. 6. The front view camera system 504 includes one or more front view cameras, e.g., CAM_M_F 711*a*, CAM_N_F 711*b* as shown in FIG. 7. Each camera has a wide field of view (e.g., using a wide-angle lens or a fish-eye lens) to obtain information about as many physical objects providing visual navigation information as possible, so that the vehicle has access to all relevant navigation information provided by these objects. For example, the viewing angle of the TLD system is about 120 degrees or more. In one example, CAM_M_F represents a front view camera with a moderate field of view (FOV) with a range, e.g., from 5 meters to 50 meters, and CAM_N_F represents a front view camera with a narrow field of view with a range, e.g., from 50 meters to 150 meters (or 200 meters). In some embodiments, in response to determining that a distance from a vehicle to an intersection satisfies, e.g., is no greater than, a predetermined threshold (e.g., 50 meters), the front view camera system 504 switches from a first front view camera (e.g., CAM_N_F) to a second front view camera (e.g., CAM_M_F).

As discussed with further details in FIG. 7, the front view TLD system 502 receives one or more front view images from the front view camera system 504. The one or more front view images include an image of at least one traffic light for the road segment (e.g., the road segment 610) that the vehicle is approaching (e.g., the traffic light 634*b* and/or the traffic light 614*a*). In one example, the front view TLD system 502 provides image data of the one or more front view images to the perception system 510 as front view TLD data 503, and the perception system 510 processes the image data to determine a state of the traffic light for the road segment, e.g., by processing the one or more front view images based on an image processing algorithm such as a feature extraction algorithm or a machine learning model such as CNN 420 of FIG. 4B or the CNN 440 of FIGS. 4C and 4D. For example, the perception system 510 uses a machine learning model that receives the image data as an input and generates a prediction representing the state of the traffic light for the road segment as an output. In one example, the front view TLD system 502 determines a state of the traffic light for the road segment based on the one or more front view images as front view TLD data 503, and provides the front view TLD data 503 to the perception system 510.

In some embodiments, the perception system 510 includes a traffic light information (TLI) generator 514 that receives the front view TLD data 503 from the front view TLD system 502. The TLI generator 514 generates the traffic light information 515 based on the TLD data 503 and/or information of traffic light for the road segment from the map information extractor 512. The traffic light information 515 includes a current state of the traffic light for the road segment that is based on the TLD data 503. The current state is a red state, a green state, or a yellow state. In one example, the traffic light information 515 includes a remaining time for the current state of the traffic light for the road segment. The TLI generator 514 determines the remaining time based on (i) a predetermined time duration for the current state obtained from the map information extractor 512, and (ii) a time point of a state change immediately preceding the current state. In one example, the TLI generator 514 continuously generates the traffic light information 515, and determines the time point of the state change immediately preceding the current state based on previously generated traffic light information and uses the time point to determine the remaining time for the current state.

The perception system 510 provides the traffic light information 515 to the planning system 520. In some embodiments, the planning system 520 updates the route based on the traffic light information 515 and provides a planned route 525 to the perception system 510, e.g., the map information extractor 512. The perception system 510 updates area information of one or more intersections obtained from the mapping database 501 based on the planned route from the planning system 520.

Based on the traffic light information 515 (e.g., a current state of the traffic light and a remaining time of the current state), information of the traffic light (e.g., a series of states and a time duration for each state from the map information extractor 512), a current distance from the vehicle (e.g., the vehicle 200 shown in FIG. 2) to the intersection (e.g., a stop sign in front of the vehicle), a route of the vehicle, and a current speed of the vehicle, the vehicle (e.g., the planning system 520) determines a state of the traffic light when the vehicle arrives the intersection from the road segment and a time remaining in the state when the vehicle arrives the intersection. Based on the state and the time remaining in the state when the vehicle arrives the intersection, the vehicle (e.g., the planning system 520) determine which action to be taken by the vehicle, e.g., to stop, to slow down, to continue at a current speed, or to speed up the current speed. The planning system 520 determines the action based on the traffic light information 515 and other data, e.g., data from the localization system 406 and the database 410 of FIG. 4A. The vehicle is caused to operate in accordance with the action by a control system, e.g., the control system 408 as shown in FIG. 4A.

As illustrated with further details in FIG. 7, in some cases, if the front view TLD system 502 malfunctions or fails to function properly, a red state of a traffic light is wrongly derived to be a green state, which may cause the vehicle to operate in an unintended manner, e.g., run a red traffic light, with risk. In examples, running a red light refers to a vehicle proceeding into an intersection from a road segment when the traffic light governing the road segment is in a red state.

In some embodiments, as shown in FIG. 5, the architecture 500 includes a side view traffic light detection (TLD) system 506 to be used as a second TLD system independent from the front view TLD system 502 to cross check the front view TLD data 503 generated by the front view TLD system 502. The side view TLD system 506 is used to derive a state of the traffic light for the vehicle based on cross traffic information (e.g., cross traffic events and/or behaviors), as the cross traffic information is related to a state of a cross traffic light that is coordinated with the state of the traffic light. In one example, a cross traffic includes one or more objects (e.g., other vehicles, pedestrians, or animals) at one or more cross roads different from a road toward which the vehicle is approaching. In one example, one or more parameters of an object in the cross traffic are detected by side Radar sensor (as described below). The one or more parameters include speed (or velocity) and distance (or range). The cross traffic events and/or behaviors include whether visibility of the cross traffic is occluded, whether the cross traffic stops (or has a speed of zero or substantially identical to zero), whether the cross traffic is approaching the intersection or far from the road the vehicle is approaching when a distance between the cross traffic and the intersection is greater than a limit (e.g., a limit listed in as a stopping distance table), and/or whether the cross traffic is decelerating when speed is decreasing.

As shown in FIG. 5, in some embodiments, the side view TLD system 506 includes a side view camera system 508a (e.g., camera 202a of FIG. 2), a LiDAR system 508b (e.g., LiDAR sensors 202b of FIG. 2), and a Radar system 508c (e.g., Radar sensors 202c of FIG. 2). In some examples, e.g., as illustrated in FIG. 7, the side view camera system 508a includes one or more left/right side view cameras (e.g., CAM_F_L 721, CAM_F_R 722); the LiDAR system 508b includes one or more left/right side LiDAR sensors (e.g., LiDAR_F_L 723, LiDAR_F_R 724); the Radar system 508c includes one or more side Radar sensors (e.g., RADAR_F_L 725, RADAR_F_R 726). In one example, the side view TLD system 506 has a left field of view (FOV), e.g., left FOV 654 as illustrated in FIG. 6, using left side sensors (e.g., CAM_F_L 721, LiDAR_F_L 723, and RADAR_F_L 725). In one example, the side view TLD system 506 has a right field of view (FOV), e.g., right FOV 656 as illustrated in FIG. 6, using right side sensors (e.g., CAM_F_R 722, LiDAR_F_R 724, and RADAR_F_R 726). As illustrated in FIG. 6, in one example, the left FOV 654 covers information of cross traffic 626 at a cross road segment 620, and the right FOV 656 covers information of cross traffic 646 at a cross road segment 640.

The side view TLD system 506 receives side view sensor data from the side view camera system 508a (e.g., side view images), from the LiDAR system 508b (e.g., LiDAR sensor data), and from the Radar system 508c (e.g., Radar sensor data). The side view TLD system 506 generates side view TLD data 505 based on the side view sensor data and provides the side view TLD data 505 to the perception system 510 (e.g., the TLI generator 514). In one example, the side view TLD data 505 includes the side view sensor data, and the TLI generator 514 derives a state of a traffic light governing a road segment (e.g., the road segment 610 of FIG. 6) that the vehicle is approaching based on the side view sensor data. In one example, the side view TLD data 505 includes a state of the traffic light derived by the side view TLD system 506 based on the side view sensor data.

In one embodiment, e.g., as illustrated with further details in FIG. 7, collected side sensor data is used to detect different types of traffic information at various locations at the intersection (e.g., at road segments perpendicular to a driving direction of the vehicle). The detected traffic information can include cross traffic events and/or behaviors, as noted above. For example, the detected traffic information includes whether visibility of the cross traffic is occluded, whether a speed of the cross traffic is no more than zero (e.g., speed≅0), whether the vehicle is approaching the intersection, and/or whether the cross traffic is slowing down. Based on the detected traffic information, the vehicle (e.g., the TLI generator 514 or the side view TLD system 506) derives a state of the traffic light at the intersection ahead of the vehicle, e.g., by determining whether a field of view of the cross traffic is occluded, whether the cross traffic is stopping or moving, whether a distance between the cross traffic and the intersection is decreasing or increasing, and/or whether the cross traffic is decelerating or accelerating.

In one embodiment, the traffic light information (TLI) generator 514 receives both the front view TLD data 503 and the side view TLD data 505, and generates the traffic light information 515 based on the TLD data 503 and/or the side view TLD data 505, e.g., cross checking a state (e.g., a green state) of a traffic light derived based on the front view TLD data 503 with a state of the traffic light derived based on the side view TLD data 505, e.g., as described with further details in FIG. 7. Then, as noted above, the perception system 510 provides the traffic light information 515 to the planning system 520 for further processing.

FIG. 7 is a flowchart of a process 700 for managing traffic light detection for a vehicle (which is the same as, or similar to, the vehicle 200 of FIG. 2 or FIG. 6) at an intersection (which is the same as, or similar to, the intersection 602 of FIG. 6). The process 700 is described below with reference to the architecture 500 of FIG. 5. In some embodiments, the process 700 is performed (e.g., completely, partially, and/or the like) by a computing device including at least one processor. The computing device is the same as, or similar to, device 300 of FIG. 3. The computing device can be included in an autonomous system, e.g., autonomous system 202 of the vehicle 200 as described in FIG. 2. In some embodiments, the autonomous system includes a perception system, e.g., the perception system 402 as shown in FIG. 4A or the perception system 510 as shown in FIG. 5, a planning system, e.g., the planning system 404 as shown in FIG. 4 or the planning system 520 as shown in FIG. 5, a control system, e.g., the control system 408 as shown in FIG. 4, and a database, e.g., the database 410 as shown in FIG. 4. The perception system can include a traffic light information generator, e.g., the TLI generator 514 of FIG. 5. One or more steps of the process 700 are performed by the traffic light information generator.

Block 710 shows one or more steps performed using a front view TLD system (e.g., the front view TLD system 502 of FIG. 5). The front view TLD system includes two front view cameras, CAM_M_F 711a and CAM_N_F 711b. Based on one or more front view images captured from the two front view cameras, traffic light detection (TLD) is performed (712), e.g., by the front view TLD system such as 502 of FIG. 5 or by a perception system such as 510 of FIG. 5, to derive a state of a traffic light (e.g., the traffic light 634b and/or 614a of FIG. 6) governing a road segment (e.g., the road segment 610 of FIG. 6) on which the vehicle is approaching the intersection or associated with the operation of the vehicle. The state of the traffic light is represented by circle 715.

In some cases, the state of the traffic light is derived to be a red state or a yellow state. In those cases, even if the actual state (e.g., real world, ground truth state of the traffic light) of the traffic light is a green state, the perception system determines that the state of the traffic light is a red state or a yellow state. The control system of the vehicle operates in accordance with the red state or yellow state, which causes a deceleration or other stopping by the vehicle. In these cases, no unintended scenario, e.g., no running of a red traffic light, occurs. The perception system directly reports the derived state of the traffic light (red or yellow state) to a planning system (e.g., the planning system 520 of FIG. 5) (716), and the process 700 ends (717). In some cases, the perception system checks whether the derived state of the traffic light is a red state or a yellow state (718), e.g., by comparing the derived state of the traffic light (715) to a predetermined state (e.g., red or yellow). If the derived state of the traffic light is the red state or the yellow state, the state of the traffic light is represented by circle 719, which is reported to the planning system (716).

In some cases, the state of the traffic light is derived to be a green state. The actual state of the traffic light can be a green state or a red or yellow state. If the front view TLD system malfunctions or fails to function properly, the actual state of the traffic light is a red state 713 while the front view TLD system or the perception system derives the state of the traffic light is a green state 714, which is considered as incorrect TLD or low confidence TLD. In those cases, in response to determining that the derived state of the traffic light is not a red state or a yellow state (718), the process 700 proceeds to step 760 for cross checking the derived state of the traffic light (712) with a derived state of the traffic light from a side view TLD system, e.g., the side view TLD system 506 of FIG. 5, that is independent from the front view TLD system.

Block 720 shows one or more steps performed using the side view TLD system and the perception system. As shown in FIG. 7, the side view TLD system includes a side view camera system (e.g., 508*a* of FIG. 5) that includes left/right side view cameras CAM_F_L 721, CAM_F_R 722, a LiDAR system (e.g., 508*b* of FIG. 5) that includes left/right side LiDAR sensors LiDAR_F_L 723, LiDAR_F_R 724, and a Radar system (e.g., 508*c* of FIG. 5) that includes left/side side Radar sensors RADAR_F_L 725, RADAR_F_R 726.

In one embodiment, the perception system performs a perception step 730, e.g., using a sensor tracking algorithm or a machine learning model such as the CNN 420 of FIG. 4B or the CNN 440 of FIGS. 4C and 4D, based on sensor data from the side view TLD system to infer cross traffic information of one or more cross road segments (e.g., the cross road segment 620, 640 of FIG. 6) adjacent to the road segment, e.g., cross traffic within the field of views 654, 656 as shown in FIG. 6. In one example, the sensor tracking algorithm includes Nearest Neighbor algorithm, Probabilistic Data Association algorithm, Multiple Hypothesis Tracking algorithm, or Interactive Multiple Model (IMM). The sensor data includes side view image data from the side view camera system, LiDAR sensor data from the LiDAR system, and/or Radar sensor data from the Radar system, which indicates the cross traffic information. The perception system determines different types of cross traffic information at the perception step 730, including whether visibility of the cross traffic is occluded (732), whether a speed of the cross traffic is no more than zero (734), whether the vehicle is approaching the intersection (736), and whether the cross traffic is slowing down (738). As these types of cross traffic information are related to a state of a cross traffic light which is coordinated with a state of the traffic light to be derived, the state of the traffic light can be determined based on the inferred cross traffic information.

The perception system derives a state of the traffic light (740) to obtain a derived state of the traffic light 750. As shown in FIG. 7, the perception system determines whether the field of view (FOV) of the cross traffic is occluded (742). If the FOV of the cross traffic is occluded, the perception system determines the state of the traffic light to be red (752). If the FOV of the cross traffic is not occluded, the perception system further determines whether a speed of the cross traffic is no more than zero (e.g., zero or substantially identical to zero) (744). If the speed of the cross traffic is no more than zero, the perception system determines the state of the traffic light to be green (754). If the speed of the cross traffic is more than zero, the perception system further determines whether the distance between the cross traffic and the intersection is greater than a limit (746). In one example, the distance limit is a predetermined limit in a stopping distance table. If the distance is greater than the limit, the perception system determines the state of the traffic light to be green (756). If the distance is smaller than or identical to the limit, the perception system determines whether the speed of the cross traffic is decreasing (748). If the speed of the cross traffic is decreasing, the perception system determines the state of the traffic light to be green (758). If the speed of the cross traffic is increasing, the perception system determines the state of the traffic light to be red (759).

At step 760, the perception system performs the cross-checking by checking whether the state derived from the front view TLD system is same as (or match) the state derived from the side view TLD system, and determines the traffic light information at the intersection based on a result of the checking.

If the state derived from the side view TLD system (e.g., green state 754, 756, 758) is determined to be same as the green state derived from the front view TLD system, the perception system determines that a current state of the traffic light at the intersection is the green state. The green state of the traffic light is represented by the circle 719 and is reported to the planning system (716).

If the state derived from the side view TLD system (e.g., red state 752, 759) is determined to be different from the green state derived from the front view TLD system, the perception system determines that a current state of the traffic light at the intersection is a red state (762), which prevents the vehicle from mistakenly or riskily operating in an unintended manner such as running a red traffic light. The red state of the traffic light determined at step 762 is represented by the circle 719 and is reported to the planning system at step 716.

In some embodiments, the perception system determines whether a duration of determining that the state of the traffic light is assumed to be the red state (due to a failure of cross checking) is more than a predetermined time duration (e.g., 3 s). If the duration is no more than the predetermined time duration, the malfunctioned TLD system returns to work, and the process 700 proceeds to end (717). If the duration is more than the predetermined time duration, it means that the malfunctioned TLD system still does not work properly, and the perception system initiates an external support (766), e.g., by triggering an alarm signal for a manual support to an operator of the vehicle, and then the process 700 proceeds to end (717).

Figure 8:
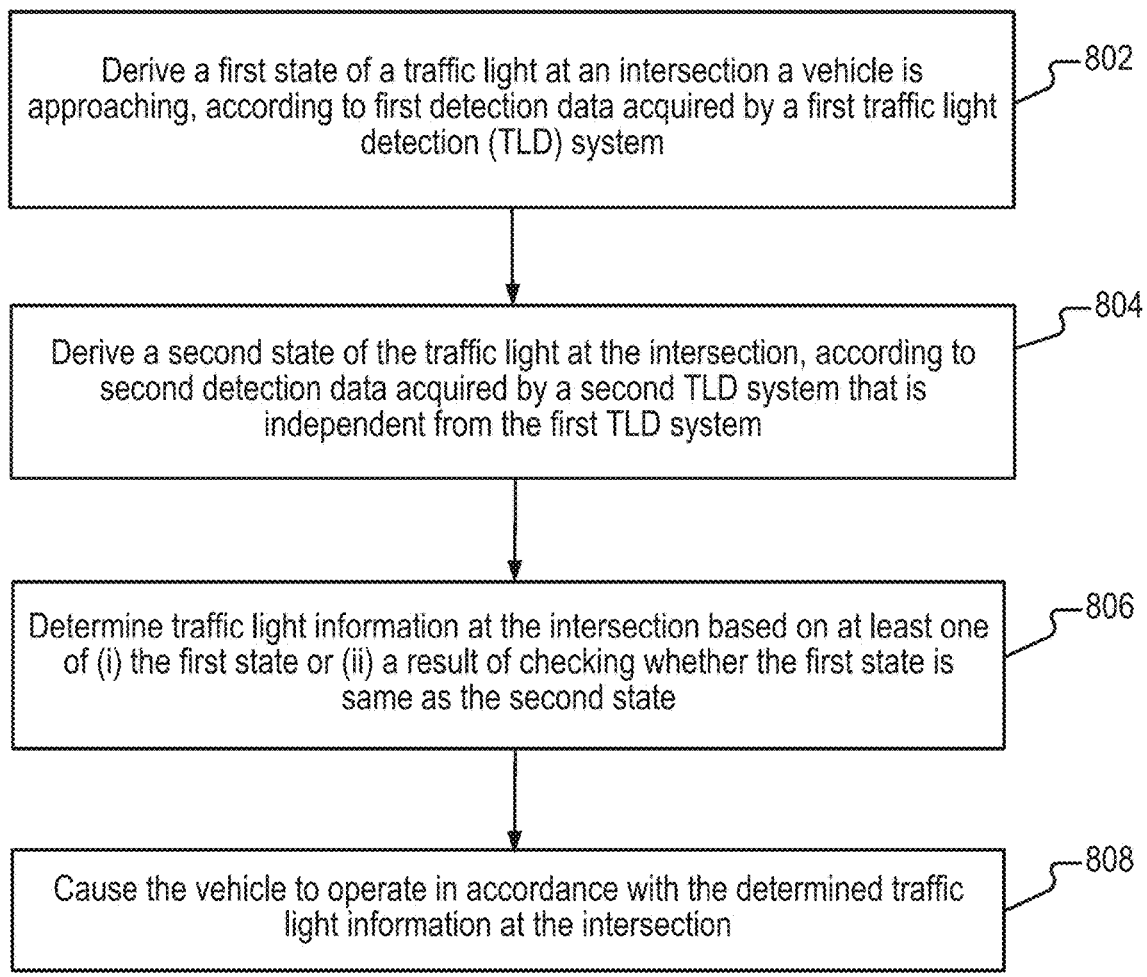
FIG. 8 is a flowchart of another process for managing traffic light detection.

Referring now to FIG. 8, illustrated is a flowchart of a process 800 for managing traffic light detection, particularly by cross-checking a result of a first traffic light detection (TLD) system using a result of a separate, independent second TLD system. In some embodiments, the process 800 is performed (e.g., completely, partially, and/or the like) by a computing device including at least one processor. The computing device is the same as, or similar to, device 300 of FIG. 3. The computing device can be included in an autonomous system, e.g., autonomous system 202 of the vehicle 200 as described in FIG. 2. Additionally, or alternatively, in some embodiments the process 800 is performed (e.g., completely, partially, and/or the like) by another device or group of devices separate from the autonomous system, e.g., the remote AV system 114 as described in FIG. 1. Steps in the process 800 can correspond to steps in the process 700 as described in FIG. 7.

In some embodiments, the autonomous system includes a perception system, e.g., the perception system 402 as shown in FIG. 4A or the perception system 510 as shown in FIG. 5, a planning system, e.g., the planning system 404 as shown in FIG. 4 or the planning system 520 as shown in FIG. 5, a control system, e.g., the control system 408 as shown in FIG. 4, and a database, e.g., the database 410 as shown in FIG. 4. The perception system can include a traffic light information generator, e.g., the traffic light information generator 514 of FIG. 5. One or more steps of the process 800 are performed by the traffic light information generator.

With reference to FIG. 8, the autonomous system derives a first state of a traffic light at an intersection a vehicle is approaching, according to first detection data acquired by a first traffic light detection (TLD) system (802). In some embodiments, step 802 corresponds to step 702. The first state of the traffic light can be red, yellow, or green.

The intersection can be the intersection 602 as shown in FIG. 6. In some embodiments, the intersection is associated with a plurality of road segments, e.g., the road segments 610, 620, 630, 640 of FIG. 6. The road segments include a first path segment (e.g., the road segment 610 of FIG. 6) towards which the vehicle is approaching, and the traffic light (e.g., the traffic light 634b of FIG. 6) controls vehicular movement at the first path segment. The road segments also include at least one cross road segment (e.g., the road segments 620, 640 of FIG. 6) adjacent to the first path segment, and a cross traffic light (e.g., the traffic light 644b, 624b of FIG. 6) controls a corresponding cross traffic movement at each of the at least one cross road segment. The cross traffic light for the at least one cross road segment is coordinated with the traffic light for the first path segment. For example, if the cross traffic light is red, the traffic light for the first path segment is green; if the cross traffic light is green, the traffic light for the first path segment is red.

In some embodiments, the first TLD system is a front view TLD system (e.g., the front view TLD system 502 of FIG. 5) that includes at least one front view camera, e.g., CAM_M_F 711a and/or CAM_N_F 711b as described in FIG. 7. The first detection data acquired by the first TLD system includes at least one front view image of the intersection which can include an image of a traffic light in front of the vehicle, e.g., within the field of view 652 as shown in FIG. 6. The autonomous system derives the first state of the traffic light according to the at least one front view image of the intersection using at least one of an image processing algorithm or a machine learning model (e.g., the CNN 420 of FIG. 4B, or the CNN 440 of FIGS. 4C and 4D).

With reference to FIG. 8, the autonomous system derives a second state of the traffic light at the intersection, according to second detection data acquired by a second TLD system that is independent from the first TLD system (804). The second state can be red or green. In one example, the second TLD system is a side view TLD system (e.g., the side view TLD system 506 of FIG. 5).

In some embodiments, e.g., as illustrated in FIG. 7, the second TLD system includes at least one of at least one side view camera (e.g., left/right side such as CAM_F_L 721, CAM_F_R 722 of FIG. 7), at least one LiDAR sensor (e.g., left/right side such as LIDAR_F_L 723, LIDAR_F_R 724 of FIG. 7), or at least one Radar sensor (e.g., left and/or right side such as RADAR_F_L 725, RADAR_F_R 726 of FIG. 7). The second detection data includes side view camera images of cross traffic, LiDAR sensor data, and/or Radar sensor data, e.g., cross traffic within the field of views 654, 656 as shown in FIG. 6.

In some embodiments, the autonomous system infers cross traffic information according to the second detection data (e.g., using a sensor tracking algorithm as illustrated in FIG. 7, a machine learning model such as the CNN 420 of FIG. 4B or the CNN 440 of FIGS. 4C and 4D), and derives the second state of the traffic light based on the inferred cross traffic information. For example, a sensor tracking algorithm receives the second detection data as an input and output the cross traffic information or the second state of the traffic light as an output.

The cross traffic information includes cross traffic events and/or behaviors on the at least one cross road segment at the intersection. In some embodiments, e.g., as illustrated in step 730 of FIG. 7, the cross traffic information includes at least one of: whether a field of view of a cross traffic is occluded, the cross traffic comprising one or more other vehicles at a cross road segment different from a road segment toward which the vehicle is approaching, whether the cross traffic is stopped, whether the cross traffic is approaching the intersection, or whether the cross traffic is slowing down.

In some embodiments, e.g., as illustrated in step 740 of FIG. 7, if the field of view of the cross traffic is occluded, the autonomous system determines the second state of the traffic light to be red; if the field of view of the cross traffic is non-occluded, the autonomous system further determines at least one of whether a speed of the cross traffic is no more than zero (e.g., zero or substantially identical to zero), whether a distance between the cross traffic and the intersection is decreasing, or whether the cross traffic is decelerating.

In some embodiments, if the speed of the cross traffic is no more than zero, the autonomous system determines the second state of the traffic light to be green; if the speed of the cross traffic is more than zero, the autonomous system further determines whether the distance between the cross traffic and the intersection is greater than a predetermined limit (e.g., a limit listed in a stopping distance table). If the distance is greater than the predetermined limit, the autonomous system determines the second state of the traffic light to be green; if the distance is smaller than or identical to the predetermined limit, the autonomous system determines whether the cross traffic is decelerating (or the speed of the cross traffic is decreasing). If the cross traffic is decelerating, the autonomous system determines the second state of the traffic light to be green; if the cross traffic is accelerating (or the speed of the cross traffic is increasing), the autonomous system determines the second state of the traffic light to be red.

In some embodiments, in response to determining that a distance from the vehicle to the intersection satisfies, e.g., is no greater than, a predetermined threshold (e.g., 50 meters), the autonomous system initiates at least one of the first TLD system or the second TLD system to detect the traffic light at the intersection.

With continued reference to FIG. 8, the autonomous system determines traffic light information at the intersection based on at least one of (i) the first state or (ii) a result of checking whether the first state is same as the second state (806).

In some embodiments, the autonomous system first determines whether the first state derived from the first TLD system is a specified state (e.g., green). If the first state (e.g., red or yellow) is different from the specified state, the autonomous system determines the traffic light information at the intersection based on the first state, bypassing cross-checking the first state with the second state. If the first state is the specified state (e.g., green), to avoid malfunction of the first TLD system, the autonomous system proceeds to perform the cross-checking by checking whether the first state derived from the first TLD system is same as (or match) the second state derived from the second TLD system, and determines the traffic light information at the intersection based on a result of the checking.

In some embodiments, if the specified state (e.g., green) is determined to be same as the second state (e.g., green), the autonomous system determines that a current state of the traffic light at the intersection is the specified state. If the specified state (e.g., green) is determined to be different from the second state (e.g., red), the autonomous system determines that a current state of the traffic light at the intersection is a red state, which can avoid the vehicle mistakenly or riskily operating in an unintended manner, e.g., running a red traffic light.

In some embodiments, if a duration of determining that the specified state is different from the second state is more than a predetermined time duration (e.g., 3 s), the autonomous system initiates an external support, e.g., by triggering an alarm signal for a manual support to an operator of the vehicle.

In some embodiments, the traffic light information includes: a current state of the traffic light at the intersection and a remaining time for the current state of the traffic light at the intersection. In some examples, the autonomous system determines the remaining time for the current state of the traffic light at the intersection based on a time point of a state change of the traffic light immediately preceding the current state and a predetermined time duration (e.g., 20 s) for the current state of the traffic light. For example, rules or protocols for managing traffic lights at the intersection set how the series of states of the traffic light are presented and how long is a duration of each state. The rules or protocols can be stored in the database, e.g., the database 410 of FIG. 4A or the mapping database 501 of FIG. 5.

With continued reference to FIG. 8, the autonomous system derives causes the vehicle to operate in accordance with the determined traffic light information at the intersection (808). For example, if the determined traffic light is red, the vehicle (e.g., the control system) can determine whether to decelerate or stop based on the remaining time for the red state and/or a travelling time to the intersection. If the determined traffic light is green, the vehicle can determine whether to keep moving or accelerate across the intersection based on the remaining time for the green state and/or a travelling time to the intersection.

Further non-limiting aspects or embodiments are set forth in the following numbered clauses:

Clause 1: A method, comprising: deriving, with at least one processor, a first state of a traffic light at an intersection a vehicle is approaching, according to first detection data acquired by a first traffic light detection (TLD) system; deriving, with the at least one processor, a second state of the traffic light at the intersection, according to second detection data acquired by a second TLD system that is independent from the first TLD system; determining, with the at least one processor, traffic light information at the intersection based on at least one of (i) the first state or (ii) a result of checking whether the first state is same as the second state; and causing, with the at least one processor, the vehicle to operate in accordance with the determined traffic light information at the intersection.

Clause 2: The method of clause 1, further comprising: determining whether the first state is a specified state.

Clause 3: The method of clause 2, comprising: in response to determining that the first state is different from the specified state, determining the traffic light information at the intersection based on the first state.

Clause 4: The method of clause 2, comprising: in response to determining that the first state is the specified state, checking whether the first state is same as the second state; and determining the traffic light information at the intersection based on the result of the checking.

Clause 5: The method of clause 4, wherein determining the traffic light information at the intersection based on the result of checking comprises: in response to determining that the specified state is same as the second state, determining that a current state of the traffic light at the intersection is the specified state.

Clause 6: The method of clause 4, wherein determining the traffic light information at the intersection based on the result of checking comprises: in response to determining that the specified state is different from the second state, determining that a current state of the traffic light at the intersection is a red state.

Clause 7: The method of clause 6, further comprising: in response to determining that a duration of determining that the specified state is different from the second state is more than a predetermined time duration, initiating, with the at least one processor, an external support.

Clause 8: The method of any one of clauses 1 to 7, wherein the first TLD system comprises at least one front view camera, and wherein the second TLD system comprises at least one of at least one side view camera, at least one LiDAR sensor, or at least one Radar sensor.

Clause 9: The method of clause 8, wherein the first detection data comprises at least one front view image of the intersection, and wherein deriving the first state of the traffic light at the intersection according to the first detection data comprises: deriving the first state of the traffic light according to the at least one front view image of the intersection using at least one of an image processing algorithm or a machine learning model.

Clause 10: The method of clause 8 or 9, wherein deriving the second state of the traffic light at the intersection according to the second detection data comprises: inferring cross traffic information according to the second detection data, and deriving the second state of the traffic light based on the inferred cross traffic information.

Clause 11: The method of clause 10, wherein the cross traffic information comprises at least one of: whether a field of view of a cross traffic is occluded, the cross traffic comprising one or more other vehicles at a cross road segment different from a road segment toward which the vehicle is approaching, whether the cross traffic is stopped, whether the distance between the cross traffic and the vehicle is greater than a limit, or whether the cross traffic is slowing down (or the speed of the cross traffic is decreasing).

Clause 12: The method of clause 11, wherein the second TLD system comprises at least one of at least one side view camera, at least one LiDAR sensor, or at least one Radar sensor, and wherein inferring cross traffic information according to the second detection data comprises at least one of: inferring whether the field of view of the cross traffic is occluded based on at least one of detection data of the at least one side view camera or detection data of the at least one LiDAR sensor, inferring whether the cross traffic is stopped based on at least one of the detection data of the at least one side view camera, the detection data of the at least one LiDAR sensor or detection data of the at least one Radar sensor, inferring whether the cross traffic is approaching the intersection based on at least one of the detection data of the at least one LiDAR sensor or the detection data of the at least one Radar sensor, or inferring whether the cross traffic is slowing down based on at least one of detection data of the at least one LiDAR sensor or the at least one Radar sensor.

Clause 13: The method of clause 11 or 12, wherein deriving the second state of the traffic light based on the inferred cross traffic information comprises: based on determining that the field of view of the cross traffic is occluded, determining the second state of the traffic light to be red; and based on determining that the field of view of the cross traffic is non-occluded, determining at least one of whether a speed of the cross traffic is no more than zero, whether a distance between the cross traffic and the intersection is decreasing, or whether the cross traffic is decelerating.

Clause 14: The method of clause 13, wherein deriving the second state of the traffic light based on the inferred cross traffic information comprises at least one of: based on determining that the speed of the cross traffic is no more than zero, determining the second state of the traffic light to be green, based on determining that the speed of the cross traffic is more than zero, determining whether the distance between the cross traffic and the intersection is decreasing, based on determining that the distance is decreasing, determining the second state of the traffic light to be green, based on determining that the distance is increasing, determining whether the cross traffic is decelerating, based on determining that the cross traffic is decelerating, determining the second state of the traffic light to be green, or based on determining that the cross traffic is accelerating, determining the second state of the traffic light to be red.

Clause 15: The method of any one of clauses 1 to 14, wherein the intersection is associated with a plurality of road segments comprising: a first path segment towards which the vehicle is approaching, the traffic light controlling vehicular movement at the first path segment, and at least one cross road segment adjacent to the first path segment, a cross traffic light controlling a corresponding cross traffic movement at each of the at least one cross road segment, the cross traffic light being coordinated with the traffic light for the first path segment.

Clause 16: The method of any one of clauses 1 to 15, wherein the traffic light information comprises: a current state of the traffic light at the intersection and a remaining time for the current state of the traffic light at the intersection.

Clause 17: The method of clause 16, wherein determining the traffic light information at the intersection comprises: determining the remaining time for the current state of the traffic light at the intersection based on a time point of a state change of the traffic light immediately preceding the current state and a predetermined time duration for the current state of the traffic light.

Clause 18: The method of any one of clauses 1 to 17, further comprising: in response to determining that a distance from the vehicle to the intersection satisfies a predetermined threshold, initiating, with the at least one processor, at least one of the first TLD system or the second TLD system to detect the traffic light at the intersection.

Clause 19: A system, comprising: at least one processor, and at least one non-transitory storage media storing instructions that, when executed by the at least one processor, cause the at least one processor to perform the method according to any one of clauses 1 to 18.

Clause 20: At least one non-transitory storage media storing instructions that, when executed by at least one processor, cause the at least one processor to perform the method according to any one of clauses 1 to 18.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    deriving, with at least one processor, a first state of a traffic light at an intersection a vehicle is approaching, according to first detection data acquired by a first traffic light detection (TLD) system;
    deriving, with the at least one processor, a second state of the traffic light at the intersection, according to second detection data acquired by a second TLD system that is independent from the first TLD system;
    determining, with the at least one processor, traffic light information at the intersection based on at least one of (i) the first state or (ii) a result of checking whether the first state is same as the second state, wherein determining the traffic light information at the intersection comprises:
        determining whether the first state is a specified state,
        when the first state is different from the specified state, determining that the traffic light information at the intersection based on the first state, and
        when the first state is the specified state, checking whether the first state is same as the second state and determining the traffic light information at the intersection based on the result of the checking; and
    causing, with the at least one processor, the vehicle to operate in accordance with the determined traffic light information at the intersection.

2. The method of claim 1, wherein determining the traffic light information at the intersection based on the result of checking comprises:
    in response to determining that the specified state is same as the second state, determining that a current state of the traffic light at the intersection is the specified state.

3. The method of claim 1, wherein the intersection is associated with a plurality of road segments comprising:
    a first path segment towards which the vehicle is approaching, the traffic light controlling vehicular movement at the first path segment, and
    at least one cross road segment adjacent to the first path segment, a cross traffic light controlling a corresponding cross traffic movement at each of the at least one cross road segment, the cross traffic light being coordinated with the traffic light for the first path segment.

4. The method of claim 1, further comprising:
    in response to determining that a distance from the vehicle to the intersection satisfies a predetermined threshold, initiating, with the at least one processor, at least one of the first TLD system or the second TLD system to detect the traffic light at the intersection.

5. The method of claim 1, wherein the traffic light information comprises:

a current state of the traffic light at the intersection and a remaining time for the current state of the traffic light at the intersection.

6. The method of claim 5, wherein determining the traffic light information at the intersection comprises:
   determining the remaining time for the current state of the traffic light at the intersection based on a time point of a state change of the traffic light immediately preceding the current state and a predetermined time duration for the current state of the traffic light.

7. The method of claim 1, wherein determining the traffic light information at the intersection based on the result of checking comprises:
   in response to determining that the specified state is different from the second state, determining that a current state of the traffic light at the intersection is a red state.

8. The method of claim 7, further comprising:
   in response to determining that a duration of determining that the specified state is different from the second state is more than a predetermined time duration, initiating, with the at least one processor, an external support.

9. The method of claim 1, wherein the first TLD system comprises at least one front view camera, and
   wherein the second TLD system comprises at least one of at least one side view camera, at least one LiDAR sensor, or at least one Radar sensor.

10. The method of claim 9, wherein the first detection data comprises at least one front view image of the intersection, and
    wherein deriving the first state of the traffic light at the intersection according to the first detection data comprises:
       deriving the first state of the traffic light according to the at least one front view image of the intersection using at least one of an image processing algorithm, a sensor tracking algorithm, or a machine learning model.

11. The method of claim 9, wherein deriving the second state of the traffic light at the intersection according to the second detection data comprises:
    inferring cross traffic information according to the second detection data, and
    deriving the second state of the traffic light based on the inferred cross traffic information.

12. The method of claim 11, wherein the cross traffic information comprises at least one of:
    whether a field of view of a cross traffic is occluded, the cross traffic comprising one or more other vehicles at a cross road segment different from a road segment toward which the vehicle is approaching,
    whether the cross traffic is stopped,
    whether a distance between the cross traffic and the intersection is greater than a predetermined limit, or
    whether a speed of the cross traffic is decreasing.

13. The method of claim 12, wherein the second TLD system comprises at least one of at least one side view camera, at least one LiDAR sensor, or at least one Radar sensor, and
    wherein inferring cross traffic information according to the second detection data comprises at least one of:
       inferring whether the field of view of the cross traffic is occluded based on at least one of detection data of the at least one side view camera or detection data of the at least one LiDAR sensor,
       inferring whether the cross traffic is stopped based on at least one of the detection data of the at least one side view camera, the detection data of the at least one LiDAR sensor, or detection data of the at least one Radar sensor,
       inferring whether the cross traffic is approaching the intersection based on at least one of the detection data of the at least one LiDAR sensor or the detection data of the at least one Radar sensor, or
       inferring whether the cross traffic is slowing down based on at least one of detection data of the at least one LiDAR sensor or the at least one Radar sensor.

14. The method of claim 12, wherein deriving the second state of the traffic light based on the inferred cross traffic information comprises:
    based on determining that the field of view of the cross traffic is occluded, determining the second state of the traffic light to be red; and
    based on determining that the field of view of the cross traffic is non-occluded, determining at least one of whether a speed of the cross traffic is no more than zero, whether a distance between the cross traffic and the intersection is greater than a predetermined limit, or whether the speed of the cross traffic is decreasing.

15. The method of claim 14, wherein deriving the second state of the traffic light based on the inferred cross traffic information comprises at least one of:
    based on determining that the speed of the cross traffic is no more than zero, determining the second state of the traffic light to be green,
    based on determining that the speed of the cross traffic is more than zero, determining whether the distance between the cross traffic and the intersection is greater than the predetermined limit,
    based on determining that the distance is greater than the predetermined limit, determining the second state of the traffic light to be green,
    based on determining that the distance is smaller than or identical to the predetermined limit, determining whether the speed of the cross traffic is decreasing,
    based on determining that the speed of the cross traffic is decreasing, determining the second state of the traffic light to be green, or
    based on determining that the speed of the cross traffic is increasing, determining the second state of the traffic light to be red.

16. A system, comprising:
    at least one processor, and
    at least one non-transitory storage media storing instructions that, when executed by the at least one processor, cause the at least one processor to perform operations comprising:
       deriving a first state of a traffic light at an intersection a vehicle is approaching, according to first detection data acquired by a first traffic light detection (TLD) system;
       deriving a second state of the traffic light at the intersection, according to second detection data acquired by a second TLD system that is independent from the first TLD system;
       determining traffic light information at the intersection based on at least one of (i) the first state or (ii) a result of checking whether the first state is same as the second state, wherein determining the traffic light information at the intersection comprises:
          determining whether the first state is a specified state, when the first state is different from the specified state, determining that the traffic light information at the intersection based on the first state, and when the first state is the specified state, checking whether the first state is same as the second state and determining the traffic light information at the intersection based on the result of the checking; and causing the vehicle to operate in accordance with the determined traffic light information at the intersection.

17. At least one non-transitory storage media storing instructions that, when executed by at least one processor, cause the at least one processor to perform operations comprising:

deriving a first state of a traffic light at an intersection a vehicle is approaching, according to first detection data acquired by a first traffic light detection (TLD) system;

deriving a second state of the traffic light at the intersection, according to second detection data acquired by a second TLD system that is independent from the first TLD system;

determining traffic light information at the intersection based on at least one of (i) the first state or (ii) a result of checking whether the first state is same as the second state, wherein determining the traffic light information at the intersection comprises:

determining whether the first state is a specified state, when the first state is different from the specified state, determining that the traffic light information at the intersection based on the first state, and when the first state is the specified state, checking whether the first state is same as the second state and determining the traffic light information at the intersection based on the result of the checking; and causing the vehicle to operate in accordance with the determined traffic light information at the intersection.

* * * * *